(12) United States Patent
Wei

(10) Patent No.: US 11,920,645 B2
(45) Date of Patent: Mar. 5, 2024

(54) ACTUATION METHOD FOR A HYDRAULIC SYSTEM HAVING A PUMP AND VALVES FOR SUPPLYING MULTIPLE CONSUMERS AND A COOLING AND/OR LUBRICATING DEVICE, AND HYDRAULIC SYSTEM

(71) Applicant: Schaeffler Technologies AG & Co. KG, Herzogenaurach (DE)

(72) Inventor: Yunfan Wei, Bühl (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 73 days.

(21) Appl. No.: 17/605,076

(22) PCT Filed: Mar. 25, 2020

(86) PCT No.: PCT/DE2020/100239
§ 371 (c)(1),
(2) Date: Oct. 20, 2021

(87) PCT Pub. No.: WO2020/216398
PCT Pub. Date: Oct. 29, 2020

(65) Prior Publication Data
US 2022/0205496 A1 Jun. 30, 2022

(30) Foreign Application Priority Data

Apr. 25, 2019 (DE) ..................... 10 2019 110 711.3

(51) Int. Cl.
*F16D 48/02* (2006.01)
(52) U.S. Cl.
CPC ...... *F16D 48/02* (2013.01); *F16D 2048/0221* (2013.01); *F16D 2048/0257* (2013.01)
(58) Field of Classification Search
CPC ............. F16D 48/02; F16D 2048/0221; F16D 2048/0257
See application file for complete search history.

(56) References Cited

U.S. PATENT DOCUMENTS 4,751,866 A 6/1988 Blake
5,826,676 A 10/1998 Ko
(Continued)

FOREIGN PATENT DOCUMENTS

AT 4837 U1 12/2001
CA 2341849 A1 9/2001
(Continued)

OTHER PUBLICATIONS

Author: Journal of Natural Technology | By: Lin at al Title: Single bucket hydraulic excavator engine microcomputer energy-saving control system Country: China.
(Continued)

*Primary Examiner* — Huan Le

(57) ABSTRACT

A method controls a hydraulic system for an actuation device and a cooling and/or lubricating device of a motor vehicle. The hydraulic system has a pump, multiple first actuation valves which are each arranged between a system rail connected to a pump outlet and a hydraulic consumer, as well as an additional valve which is arranged between the pump outlet and a coolant and/or lubricant supply line. The pump is switched between a normal operation and an enhanced operation according to an existing total energy demand of the hydraulic consumer. In normal operation, the pump is permanently driven and the additional valve is opened and closed to control pressure in the system rail. In enhanced operation, the pump is permanently driven, the additional valve is permanently closed and each of the actuation valves is operated according to an individual energy demand of the respective hydraulic consumer.

12 Claims, 4 Drawing Sheets

(56) References Cited

U.S. PATENT DOCUMENTS

| | | | |
|---|---|---|---|
| 7,739,941 | B2 | 6/2010 | Noble et al. |
| 7,757,831 | B2 | 7/2010 | Stehr |
| 8,439,805 | B2 * | 5/2013 | Grundler ............ F16H 61/0031 |
| | | | 477/174 |
| 8,899,397 | B2 | 12/2014 | Ito et al. |
| 8,900,086 | B2 * | 12/2014 | Asano .................. F16D 48/066 |
| | | | 475/233 |
| 9,976,576 | B2 * | 5/2018 | Brittan .................... F16D 48/02 |
| 10,408,285 | B2 | 9/2019 | Herkommer |
| 2001/0015128 | A1 | 8/2001 | Stolle et al. |
| 2002/0066428 | A1 | 6/2002 | Kammerdiener et al. |
| 2006/0131123 | A1 | 6/2006 | Grethel et al. |
| 2007/0175726 | A1 | 8/2007 | Combes |
| 2008/0242464 | A1 | 10/2008 | Kumazaki et al. |
| 2015/0337950 | A1 | 11/2015 | Knoth et al. |

FOREIGN PATENT DOCUMENTS

| | | |
|---|---|---|
| CA | 2976967 A1 | 8/2016 |
| CN | 87106712 A | 9/1988 |
| CN | 202125581 U | 1/2012 |
| CN | 102588578 A | 7/2012 |
| CN | 107636340 A | 1/2018 |
| DE | 3347473 A1 | 7/1985 |
| DE | 10150598 A1 | 4/2003 |
| DE | 10337556 A1 | 3/2004 |
| DE | 10340993 A1 | 3/2005 |
| DE | 102006046710 A1 | 4/2008 |
| DE | 102011122878 A1 | 1/2013 |
| DE | 102013102705 A1 | 9/2014 |
| DE | 102013211911 A1 | 12/2014 |
| DE | 102014208182 A1 | 12/2014 |
| DE | 102014216648 A1 | 3/2015 |
| DE | 102016110915 A1 | 12/2017 |
| DE | 102017115484 B3 | 11/2018 |
| DE | 102018130700 A1 | 6/2020 |
| DE | 102019123965 A1 | 3/2021 |
| EP | 1451493 A1 | 9/2004 |
| EP | 1519026 A2 | 3/2005 |
| EP | 2151586 A2 | 2/2010 |
| EP | 2375086 A2 | 10/2011 |
| JP | 2014181819 A | 9/2014 |
| WO | 2009102740 A2 | 8/2009 |
| WO | 2010083862 A1 | 7/2010 |
| WO | 2020216396 A1 | 10/2020 |

OTHER PUBLICATIONS

Author: Journal of Sencory Technology | By: Long et al Title: Research on single-cip microcomputer composite control pressure flow Date: Jun. 1, 1994 Country: China.

Author: Hydraulics and Pneumatics | By: Bo Title: Design of hydraulic control system for metering rod of high speed paper sizing machine Date: Sep. 1, 2009 Country: China.

* cited by examiner

ACTUATION METHOD FOR A HYDRAULIC SYSTEM HAVING A PUMP AND VALVES FOR SUPPLYING MULTIPLE CONSUMERS AND A COOLING AND/OR LUBRICATING DEVICE, AND HYDRAULIC SYSTEM

CROSS-REFERENCE TO RELATED APPLICATIONS

This application is the U.S. National Phase of PCT Appln. No. PCT/DE2020/100239 filed Mar. 25, 2020, which claims priority to DE 10 2019 110 711.3 filed Apr. 25, 2019, the entire disclosures of which are incorporated by reference herein.

TECHNICAL FIELD

The disclosure relates to a method for controlling a hydraulic system for an actuating device and a cooling and/or lubricating device of a motor vehicle, such as a car, truck, bus or other utility vehicle. The actuating device is preferably a clutch actuating device which has an actuating effect on a clutch of a drive train of the motor vehicle. The cooling and/or lubricating device is preferably a hydraulic medium distribution device which is coupled to a transmission and is used to cool and lubricate the components of the transmission. The disclosure also relates to a hydraulic system which is designed to carry out this method.

BACKGROUND

Generic methods for actuating at least one clutch are known from the prior art, for example from DE 10 2014 208 182 A1. It is also known to supplement hydraulic systems in such a way that they can be used to supply a cooling and/or lubricating device. Corresponding state of the art of the applicant is published in DE 10 2018 130 700

Further prior art can be seen in connection with FIG. 4. A power pack system 1' has a pressure accumulator which, during operation, is kept at a relatively high pressure level by means of a hysteresis control. Control of the pump can be implemented in a relatively simple manner using what is termed a two-point controller and control of the individual valves can be decoupled from the pump control. However, this system has the disadvantage that due to the existing pressure accumulator, a relatively high pressure is provided even in those operating states in which this high pressure is not required, since the individual hydraulic consumers K0, K1, K2 would get by with significantly lower pressure. As a result, a relatively large part of the energy previously fed into the pressure accumulator is lost again at a valve edge of the valve.

In addition, there are in principle hydraulic arrangements without pressure accumulators, but these systems often have the disadvantage that they are of relatively complex construction. The pump control must also be coordinated with the valve control as precisely as possible in order to avoid any restrictions on drivability.

SUMMARY

It is desirable to eliminate the disadvantages known from the prior art and in particular to provide the simplest possible and robustly functioning control strategy for the simplest possible construction of a hydraulic system.

A method controls a hydraulic system for an actuating device and a cooling and/or lubricating device of a motor vehicle. The hydraulic system has a pump, several actuating valves, which actuating valves are each arranged between a system rail connected to a pump outlet and a hydraulic consumer, and an additional valve, which additional valve is arranged between the pump outlet and a coolant and/or lubricant supply line. The pump is switched between normal operation and enhanced operation depending on an existing (determined at regular time intervals) total power requirement of the hydraulic consumers. In normal operation, in which the pump is permanently driven, an existing system pressure in the system rail is determined at regular time intervals and a target pressure for the system rail is calculated; an upper pressure threshold and a lower pressure threshold are also established on the basis of the target pressure, the additional valve being opened when the system pressure is above the upper pressure threshold and the additional valve being closed when the system pressure is below the lower pressure threshold. In the enhanced mode, the pump is permanently driven, the additional valve is permanently closed and each of the actuating valves designed as pressure control valves is operated at least temporarily depending on the individual power requirements of the specific hydraulic consumer as soon as the system pressure reaches or exceeds a threshold value.

This enables a hydraulic system to dispense with a pressure accumulator and to control the pump and valves as independently as possible in order to effectively carry out, for example, a clutch actuation and a hydraulic supply of the cooling and lubricating device. This significantly simplifies the control of the hydraulic system.

Further advantageous embodiments are explained in more detail below.

Accordingly, it is also advantageous if, at least in normal operation, control of the actuating valves is (completely) decoupled from control of the pump.

It is also advantageous if a maximum (electrical) system voltage is applied to an electric motor driving the pump both in a first drive state of normal operation, in which the additional valve is closed, and in enhanced operation. This keeps the control method as simple as possible.

If a different, preferably lower or the same electrical voltage is applied to the electric motor driving the pump in the first drive state of normal operation in which the additional valve is closed as in a second drive state of normal operation in which the additional valve is open, the hydraulic system is operated particularly efficiently.

To implement the enhanced operation, it is also useful if a pressure relief valve is integrated/arranged in the system rail.

It is also advantageous if a check valve blocking a return flow of hydraulic medium from the system rail to the pump is arranged between the pump outlet and the system rail, a junction leading to the additional valve being arranged between the pump outlet and the check valve.

Furthermore, it is useful if the total power requirement (all hydraulic consumers) determining a switchover between normal operation and enhanced operation corresponds to a total volume flow requirement of all consumers, the enhanced operation being activated when the total volume flow requirement is above an upper volume flow threshold, and normal operation is activated when the total volume flow requirement is below a lower volume flow threshold value. This results in even easier controllability of the hydraulic system.

In this regard, it is again advantageous if the upper volume flow threshold value and/or the lower volume flow threshold value are/is formed by a fixed constant or a temperature-dependent and/or system pressure-dependent variable. As a result, the control method is kept particularly simple.

It is also advantageous if the total volume flow requirement is calculated on the basis of a sum of a first partial volume flow requirement determined by a first hydraulic consumer and a second partial volume flow requirement determined by at least one further second hydraulic consumer, the specific partial volume flow requirement being determined using a pressure-volume function stored in the software. In further versions, there are also more than two hydraulic consumers, each of which has a partial volume flow requirement. Accordingly, the total volume flow requirement is calculated on the basis of a sum of individual partial volume flow requirements/partial volume flow requirements of more than two hydraulic consumers.

It is also advantageous if the target pressure is a maximum value from the group of target consumer pressures required at the specific individual consumer. This allows the target pressure to be determined in a simple manner.

For the implementation of normal operation, it is also useful if the upper pressure threshold is calculated using a first impact factor based on the target pressure and/or the lower pressure threshold is calculated using a second impact factor based on the target pressure, wherein the at least one impact factor is a fixed constant or a temperature-dependent and/or system pressure-dependent variable.

A hydraulic system is designed to carry out a method as described above.

In other words, a control method for a hydraulic arrangement (hydraulic system) with a pump and a plurality of valves is proposed. The control method identifies an "event" with a high power requirement and reacts to it in a targeted manner. There are two modes of operation: Normal operation and event intervention (enhanced operation). In normal operation, the pump is controlled by means of a hysteresis control so that the system pressure is constantly kept at a sufficient level. For this purpose, the target pressure of the system rail is calculated in a first sub-step a). In a second sub-step b), an upper threshold and a lower threshold are calculated from the target pressure. In a third sub-step c) the pump is driven in a first drive state (valve open) when the system pressure is above the upper threshold, and driven in a second drive state (valve closed) when the system pressure is below the lower threshold. In normal operation, the valve control is decoupled from the pump control. Each control is based only on the target requirements of individual consumers, e.g., the target pressure of a clutch. In the "event intervention" mode, the pump is constantly driven. However, the valve control initially remains unchanged. This means that the valve power supply or the applied valve voltage remains at the same level as when the "event intervention" mode was activated. Only after the system pressure has reached a threshold value are these valves controlled depending on the target requirement of individual consumers.

BRIEF DESCRIPTION OF THE DRAWINGS

In the following, the hydraulic system and control method are now explained in more detail with reference to figures.
In the figures.

DETAILED DESCRIPTION

Figure 2:
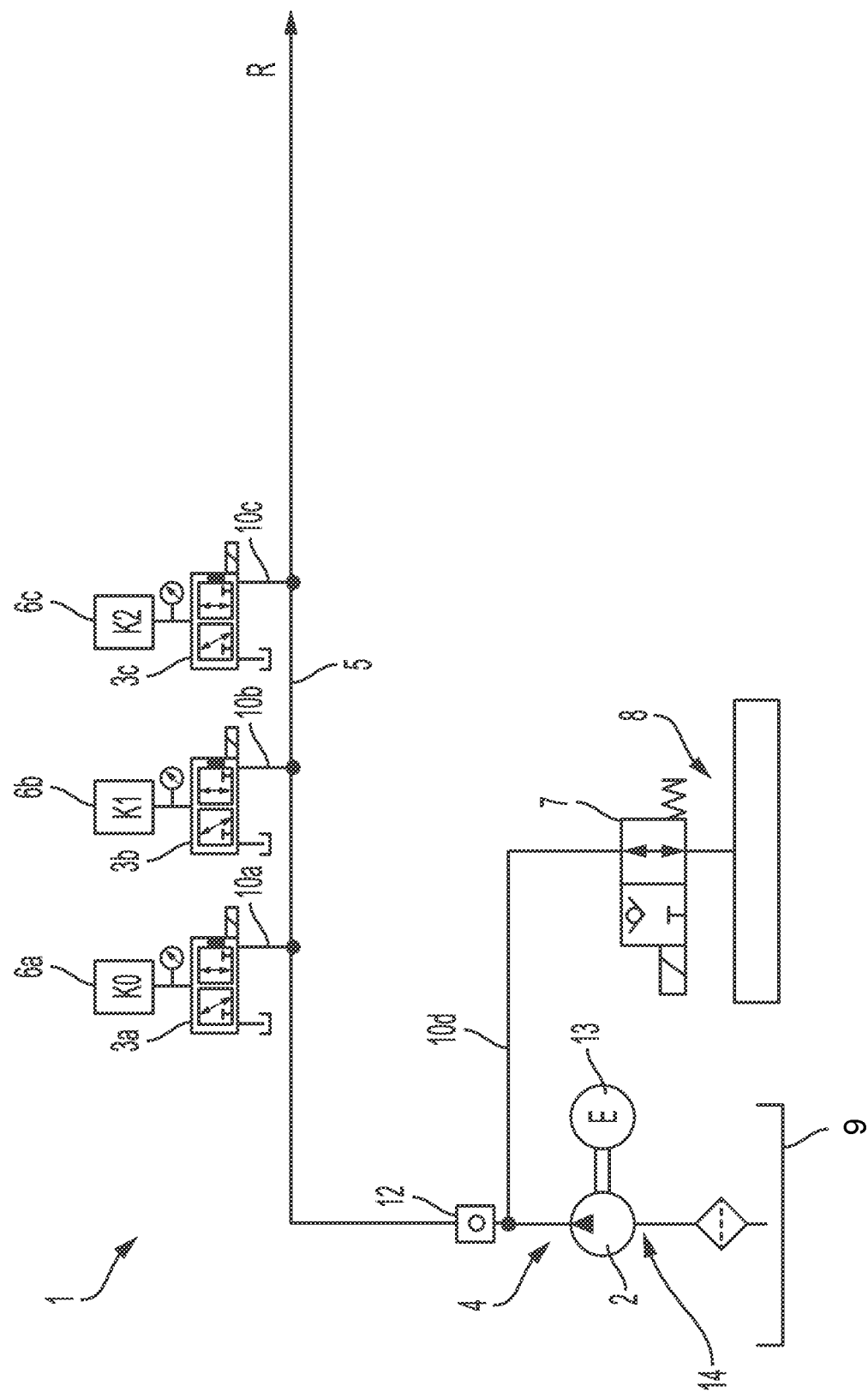
FIG. 2 shows a schematic diagram of a hydraulic system according to a first exemplary embodiment, which can be controlled with the control strategy according to FIG. 1.

A hydraulic system 1 has, according to a first exemplary embodiment, the structure shown in FIG. 2. In comparison with a hydraulic system 1' according to FIG. 4, the hydraulic system 1 of the embodiment does not include a pressure accumulator. Several junctions 10a, 10b, 10c branch off from the system rail 5, each of which can be connected to a hydraulic consumer 6a, 6b, 6c (K0, K1, K2) with the interposition of an actuating valve 3a, 3b, 3c. The actuating valves 3a to 3c assigned to the individual consumers 6a to 6c are each implemented as pressure regulating valves/pressure reducers. Also, in a typical manner, as can be seen in connection with a further hydraulic system 1 according to a second exemplary embodiment in FIG. 3, a pressure limiting valve 11, not further shown here for the sake of clarity, is mounted in a system rail 5 connected to an outlet 4 of a pump 2.

As can also be seen in FIG. 2, the hydraulic system 1 is equipped with a pump 2 driven by an electric motor 13. The pump 2 is thus operated/controlled via the electric motor 13. The pump 2 is connected to its inlet 14 via a tank 9. The outlet 4 of the pump 2 is connected directly to the system rail 5. In this embodiment, three junctions 10a to 10c run from the system rail 5 to the actuating valves 3a to 3c. Each of the junctions 10a to 10c is coupled to a hydraulic consumer 6a to 6c as a function of the position of the actuating valve 3a to 3c. Accordingly, in this embodiment, a first junction 10a branching off from the system rail 5 can be coupled to a first hydraulic consumer 6a via a first actuating valve 3a. Another second junction 10b arranged along the system rail 5 offset from the first junction 10a can be coupled to a second consumer 6b via a further second actuating valve 3b. A third junction 10c, which in turn is offset from the two first and second junctions 10a and 10b, can be coupled to a third consumer 6c via a third actuating valve 3c. According to further embodiments, however, it is in principle also possible to provide fewer than three consumers 6a, 6b, 6c, preferably only two consumers or more than three consumers. The consumers 6a, 6b, 6c are each part of an actuating device of a clutch (K0, K1, K2) of a drive train, for example in the form of a pressure cylinder.

In addition, a check valve 12 is inserted between the outlet 4 of the pump 2 and the system rail 5. The check valve 12 is typically used in such a way that it blocks a return flow of hydraulic medium from the system rail 5 to the pump 2. Another fourth junction 10d is connected directly to the outlet 4 (permanent) on a side of the check valve 12 facing the pump 2. The outlet is coupled to an additional valve 7 (also referred to as a cooling valve) via the fourth junction 10d, a valve outlet 14 of the additional valve 7 being further connected to a coolant and/or lubricant supply line 8. The coolant and/or lubricant supply line 8 is further connected in a typical manner to a cooling and lubricating device of a transmission.

Figure 3:
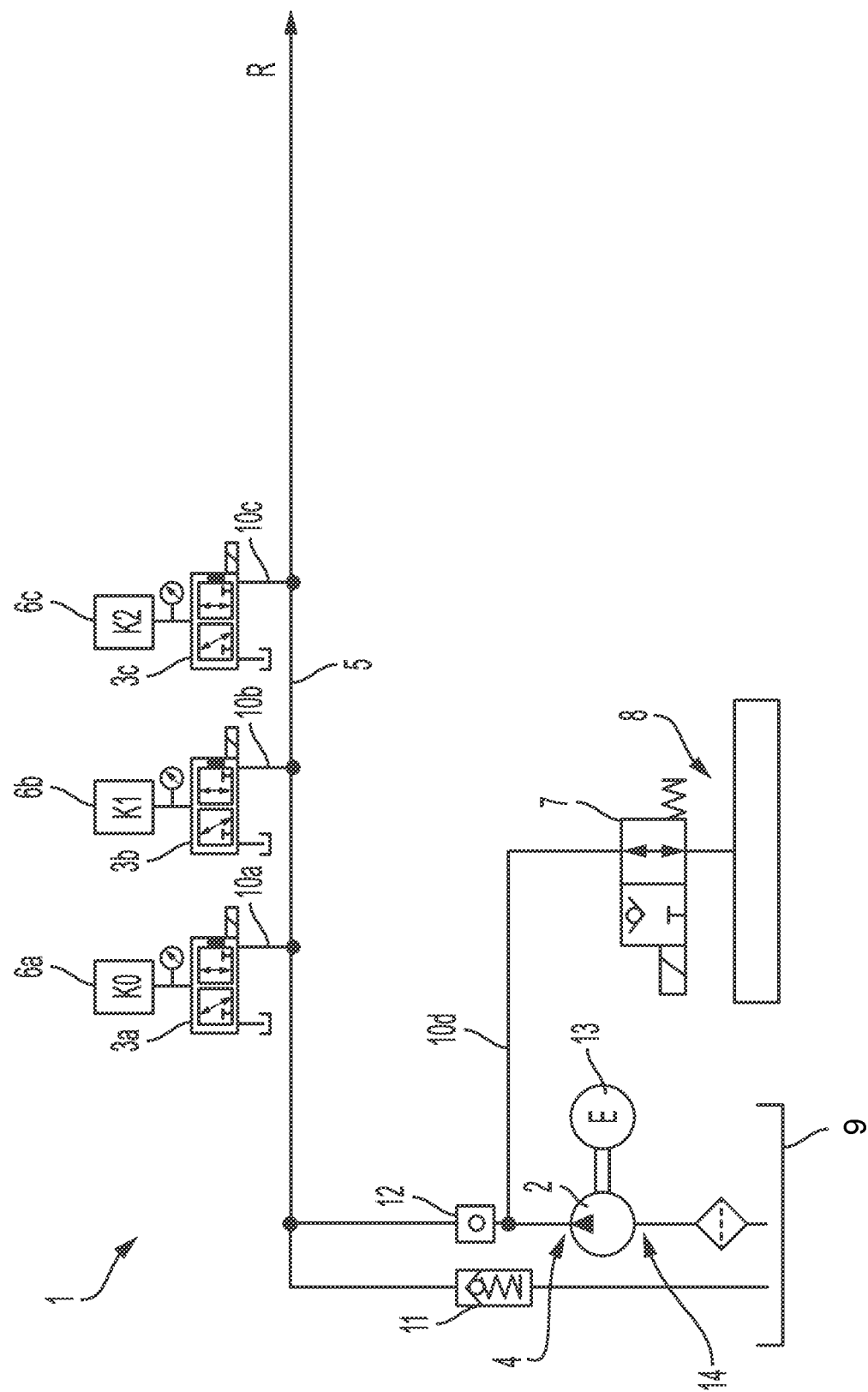
FIG. 3 shows a schematic diagram of a hydraulic system according to a second exemplary embodiment, which can also be controlled with the control strategy according to FIG. 1 and, in contrast to the first exemplary embodiment, is equipped with a pressure limiting valve.
Figure 4:
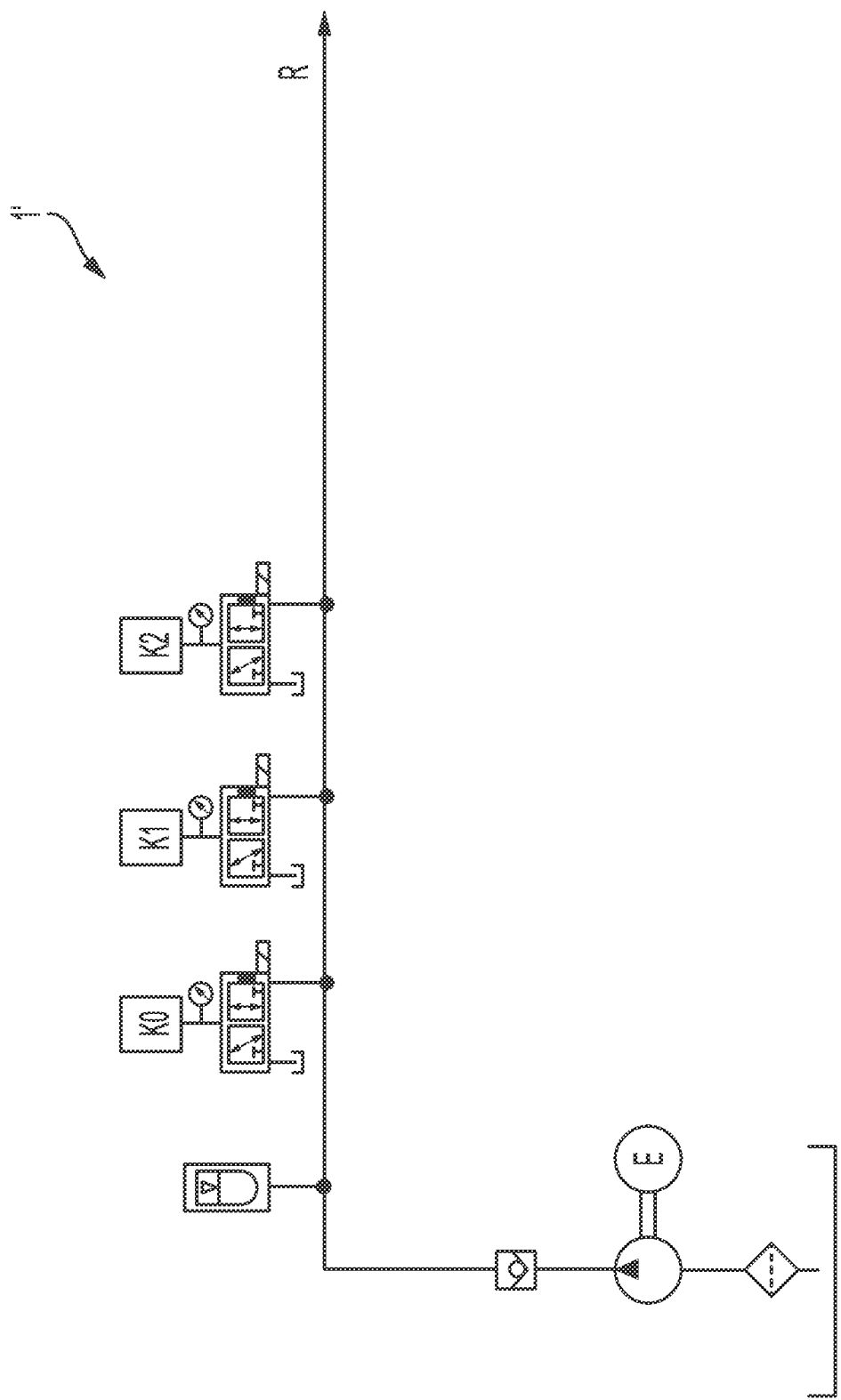
FIG. 4 is a schematic diagram of a hydraulic system with a pressure accumulator designed according to the prior art.
The figures are only schematic in nature.

The hydraulic system 1 shown in connection with FIG. 3 according to the second exemplary embodiment differs from the first exemplary embodiment only in the provision of the pressure limiting valve 11, which is connected to the system rail 5. The rest of the structure of the hydraulic system 1 according to FIG. 3 corresponds to the hydraulic system 1 according to FIG. 2.

Figure 1:
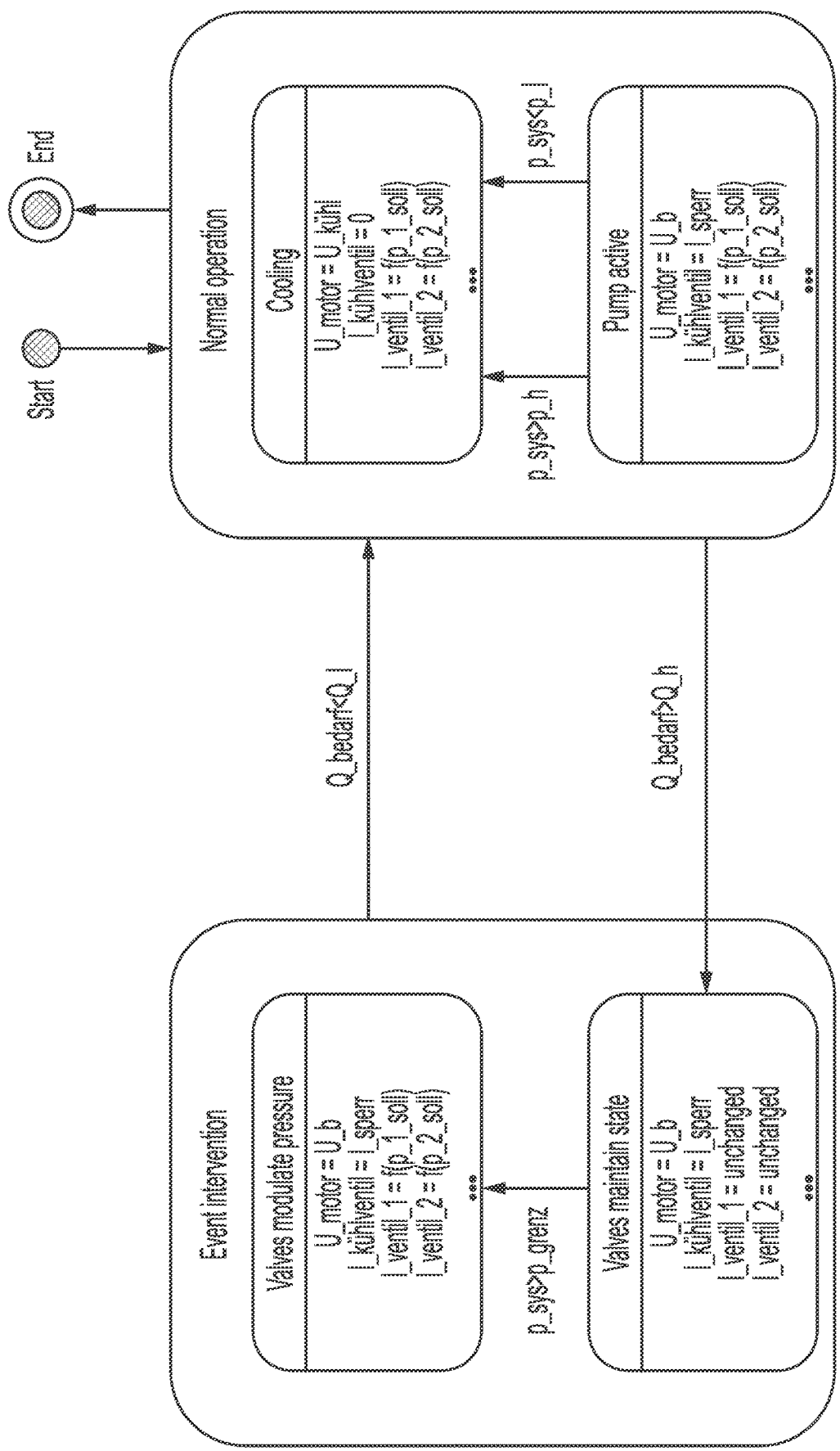
FIG. 1 shows a representation of a state machine to illustrate a control strategy of a hydraulic system.

A method for controlling the hydraulic system 1 is illustrated in FIG. 1. The method can be implemented both with the hydraulic system according to FIG. 2 and with the hydraulic system according to FIG. 3.

The pump 2 can be switched between its normal operation and its enhanced operation as a function of an existing total power requirement (total volume flow requirement Q_bedarf) of the hydraulic consumers 6a, 6b, 6c.

Normal operation is that operation of the pump 2 in which an existing system pressure p_sys is determined/measured in the system rail 5 at regular time intervals and a target pressure p_sys_soll of the system rail 5 is calculated. The target pressure p_sys_soll is that value which represents the highest pressure value to be set in the system. The target pressure p_sys_soll is thus a maximum value from the group of consumer target pressures required at the specific individual consumer 6a, 6b, 6c. An upper pressure threshold p_h and a lower pressure threshold p_l are defined on the basis of the target pressure p_sys_soll. The upper pressure threshold p_h and the lower pressure threshold p_l are calculated on the basis of an impact factor that represents a fixed constant or a temperature-dependent variable. The pump 2 is driven in a second drive state when the system pressure p_sys is below the lower pressure threshold p_l and driven in a first drive state when the system pressure p_sys is above the upper pressure threshold p_h. Thus, in normal operation, a certain pressure level is always kept constant in the system rail 5 (between the lower pressure threshold p_l and the upper pressure threshold p_h). The pump 2 is switched between its two drive states in order to maintain this pressure level. An electrical voltage U_b applied to the electric motor 13 driving the pump 2 in the first drive state of normal operation is preferably lower than an electrical voltage U_kühl applied in a second drive state of normal operation in which the additional valve 7 is open.

An additional enhanced operation of the pump 2 is implemented. This enhanced operation is activated when the total power requirement Q_bedarf exceeds a specified power requirement. The total volume flow requirement Q_bedarf of all consumers 6a, 6b is determined as the total power requirement. The total volume flow requirement Q_bedarf is a sum of partial volume flow requirements (V_1_bedarf, V_2_bedarf, ... ) of all individual hydraulic consumers 6a, 6b, 6c at the specific point in time. The specific partial volume flow requirement is determined using a pressure-volume function stored in the software. Accordingly, enhanced operation is activated/normal operation is deactivated when the total volume flow requirement Q_bedarf is above an upper volume flow threshold value Q_h and normal operation is activated/enhanced operation is deactivated when the total volume flow requirement Q_bedarf is below a lower volume flow threshold value Q_l. The upper volume flow threshold Q_h and the lower volume flow threshold Q_l are each calculated/derived either by a fixed constant or a temperature-dependent and system pressure-dependent variable.

In the enhanced operation, the pump 2 is driven permanently as in the normal operation. In the enhanced operation, the pump 2 is driven with the same electrical voltage/system voltage U_b as in the first drive state of normal operation. Each of the actuating valves 3a, 3b, 3c designed as pressure regulating valves is operated in the enhanced mode at least temporarily depending on an individual power requirement of the specific hydraulic consumer 6a, 6b, 6c as soon as the system pressure p_sys reaches or exceeds a threshold value p_limit. In other words, this means that each of the actuating valves 3a, 3b, 3c is used specifically for pressure reduction when the system pressure p_sys in the system rail 5 reaches or exceeds the threshold value p_limit.

Activation of the actuating valves 3a, 3b, 3c takes place in a typically completely decoupled manner/independently of activation of the pump 2/the electric motor 13.

In connection with FIG. 1, a typical calculation and determination of the specific values that cause the switchover is listed. A motor voltage is denoted by U motor in this figure. The system voltage is labeled U_b, while the voltage of the second drive state, which in comparison with the system voltage U_b is lower, is labeled U_kühl. A valve current which controls each of the actuating valves 3a, 3b, 3c is denoted by I_ventil_1 (first actuating valve 3a), I_ventil_2 (second actuating valve 3b). Since the specific actuating valve 3a, 3b is implemented as a pressure control valve, the valve current I_ventil_1, I_ventil_2 is controlled according to a function according to the corresponding target pressure that is to be implemented at the actuating valve 3a, 3b (f(p_1_soll); f(p_2_soll)). When the limit pressure value/threshold value p_limit is reached, the activation of the actuating valves 3a, 3b is switched over accordingly in the enhanced operation.

Since conventional pressure regulating valves are used, there is usually a mathematical relationship between the target pressure (p_1_soll; p_2_soll) after the actuating valve and the valve current (I_ventil_1; I_ventil_2). This means that the pressure downstream of the actuating valve 3a, 3b, 3c is controlled by the valve current, i.e. I_ventil=f (p_1_soll) or p_1_soll=f−1 (I_ventil)

In order to use the control strategy that is visualized in FIG. 1, the following signal values must be determined for each time step i: 1. For the pressure interfaces, p_h and p_l of the pressure hysteresis, control must be determined mathematically as follows:

$$p\_sys\_soll = \max(p\_1\_soll, p\_2\_soll, \ldots)$$

$$p\_h = p\_sys\_soll + dp\_h$$

$$p\_l = p\_sys\_soll + dp\_l$$

Here, dp_h and dp_l are stored constants or depend on the operating temperature and p_sys_soll from a function/characteristic field. The following applies:

$$dp\_h > dp\_l > 0$$

and consequently $$p\_h > p\_l > p\_sys\_soll$$

In order to know whether an event intervention, i.e., the activation of the enhanced operation, is necessary, Q_bedarf, Q_h and Q_l are determined mathematically:

$$Q\_bedarf = (V\_1\_bedarf + V\_2\_bedarf + \ldots)/(ti - ti-1)$$

With $$V\_1\_bedarf = \max[(V\_1(p\_1\_solli) - V\_1(p\_1\_solli-1)), 0]$$

$$V\_2\_bedarf = \max[(V\_2(p\_2\_solli) - V\_2(p\_2\_solli-1)), 0]$$

In a further preferred embodiment, Q_bedarf is also determined mathematically as follows:

$$Q\_bedarf = (V\_1\_bedarf + V\_2\_bedarf + \ldots)/(ti - ti-1)$$

With $$V\_1\_bedarf = \max[(V\_1(p\_1\_solli) - V\_1(p\_1\_isti)), 0]$$

$$V\_2\_bedarf = \max[(V\_2(p\_2\_solli) - V\_2(p\_2\_isti)), 0]$$

The functions V_1 and V_2 are pressure-volume characteristics stored in software. Q_h and Q_l are constants or depend on the operating temperature and p_sys_soll from a function/characteristic field. p_1_solli is a target pressure at the first hydraulic consumer 6a at a point in time i; p_2_solli is a target pressure at the second hydraulic consumer 6b at time i. Accordingly, p_1_solli−1 is a target pressure at the first hydraulic consumer 6a at a time i−1 and p_2_solli−1 is a target pressure at the second hydraulic consumer 6b at the time i−1. p_1_isti is an actually present (actual) pressure at the first hydraulic consumer 6a at time i and p_2_isti is an actually present (actual) pressure at the second hydraulic consumer 6b at time i.

The motor voltage U_b to be applied is preferably a constant, but in further versions it is also calculated using a function/characteristic field of the operating temperature and p_sys_soll. The motor voltage U_b to be applied can also result directly from pressure regulation.

The additional valve 7 is also designed such that it assumes the open position in its rest position, i.e., in its de-energized state (I_kühlventil=0). In its closed position, however, the additional valve 7 is energized (I_kühlventil=I_sperr). This closed position of the additional valve 7 is also permanently present during the entire expansion operation.

In other words, the basic idea is to identify an event with a high power requirement and to react to it in a targeted manner. Based on this idea, there are two modes of operation: Normal operation and event intervention (enhanced operation). In order to assess whether a change must be made between normal operation and event intervention, the total volume flow requirement of all consumers 6a, 6b, 6c (Q_bedarf) is calculated. If the value is above an upper threshold Q_h, the "event intervention" mode is activated. If the value is below a lower threshold Q_l, the "normal operation" mode is activated. In order to simplify the control in normal operation and in enhanced operation, the maximum available voltage is preferably always applied to the pump motor 7 when the pump 2 is to be driven. The system 1 preferably contains a pressure-limiting valve 11 on the system rail 5, which prevents an excessively high system pressure p_sys during the event-intervention.

LIST OF REFERENCE SYMBOLS

1 Hydraulic system
2 Pump
3a First actuating valve
3b Second actuating valve
3c Third actuating valve
4 Outlet
5 System rail
6a First consumer
6b Second consumer
6c Third consumer
7 Additional valve
8 Coolant and/or lubricant supply line
9 Tank
10a First junction
10b Second junction
10c Third junction
10d Fourth junction
11 Pressure relief valve
12 Check valve
13 Electric motor
14 Inlet

The invention claimed is:

1. A method for controlling a hydraulic system for an actuation device and a cooling and/or lubricating device of a motor vehicle, wherein the hydraulic system has a pump, multiple actuation valves each arranged between a system rail connected to a pump outlet and at least one hydraulic consumer, as well as an additional valve arranged between the pump outlet and a coolant and/or lubricant supply line, wherein the pump is switched between a normal operation and an enhanced operation according to an existing total energy demand of the at least one hydraulic consumer, wherein, in normal operation, the pump is continuously driven, a pressure in the system rail is determined at regular time intervals, a target pressure of the system rail is calculated, and an upper pressure threshold and a lower pressure threshold are established on the basis of the target pressure, and the additional valve is closed when the system pressure is below the lower pressure threshold, and is opened when the system pressure is above the upper pressure threshold, and wherein, in the enhanced operation, the pump is continuously driven, the additional valve is continuously closed and each of the actuation valves is operated according to an individual energy demand of the respective hydraulic consumer after the system pressure achieves a threshold value.

2. The method according to claim 1, wherein, in normal operation, control of the actuation valves is decoupled from a control of the pump.

3. The method according to claim 1, wherein a maximum available system voltage is applied to an electric motor driving the pump both in a first drive state of normal operation, in which the additional valve is closed, and in enhanced operation.

4. The method according to claim 3, wherein a voltage lower than the maximum available system voltage is applied to the electric motor driving the pump in a second drive state of normal operation, in which the additional valve is opened.

5. The method according to claim 1, wherein a pressure relief valve is arranged in the system rail.

6. The method according to claim 1, wherein a check valve blocking return flow of hydraulic medium from the system rail to the pump is arranged between the pump outlet and the system rail, and wherein a junction leading to the additional valve is arranged between the pump outlet and the check valve.

7. The method according to claim 1, wherein a total power requirement determining a switchover between normal operation and the enhanced operation corresponds to a total volume flow requirement of the at least one hydraulic consumer, wherein the enhanced operation is activated when the total flow requirement is above an upper volume flow threshold and normal operation is activated when the total volume flow requirement is below a lower volume flow threshold.

8. The method according to claim 7, wherein the total volume flow requirement is calculated based on a sum of a first partial volume flow requirement determined by a first hydraulic consumer and a second partial volumetric flow requirement determined by at least one further second hydraulic consumer, wherein the respective partial volumetric flow requirement is determined using a pressure-volume function stored in software.

9. The method according to claim 1, wherein the target pressure is a maximum value from the group of target consumer pressures required at the specific individual consumer.

10. A hydraulic system for a motor vehicle, wherein the hydraulic system is designed to carry out a method according to claim 1.

11. A method of controlling a hydraulic system, the hydraulic system including an electrically driven pump, a plurality of regulator valves feeding corresponding consumers, and a lubrication/cooling valve, the method comprising:

in response to a total flow demand rising above an upper flow threshold, operating in an enhanced mode in which
the pump is driven with a first current level,
the lubrication/cooling valve is closed, and
the regulator valves are held steady until a system pressure exceeds a first pressure threshold, after which the regulator valves are operated based on pressure demands of the respective consumers; and in response to the total flow demand falling below a lower threshold, operating in a normal mode in which
the regulator valves are operated based on the pressure demands of the respective consumers,
the pump is driven with the first current and the lubrication/cooling valve is closed in response to the system pressure falling below a lower pressure threshold, and
the pump is driven with a second current lower than the first current and the lubrication/cooling valve is opened in response to the system pressure rising above an upper pressure threshold.

12. The method of claim 11, wherein the lower pressure threshold is calculated by adding a first increment to a maximum of pressure demands of the consumers and the upper pressure threshold is calculated by adding a second increment to the maximum of the pressure demands of the consumers.

* * * * *